US008437750B2

(12) United States Patent
Fitzgerald et al.

(10) Patent No.: US 8,437,750 B2
(45) Date of Patent: May 7, 2013

(54) COMMUNICATIONS SYSTEM AND METHOD

(75) Inventors: Michael Fitzgerald, County Kerry (IE);
Guy Waugh, County Kerry (IE);
Richard Lord, Cork (IE); Michael Godley, County Kerry (IE); Christopher Young, Dublin (IE); Liam Kenny, County Wicklow (IE); Ian Walter, Vienna, VA (US); Tadhg Crotty, County Cork (IE)

(73) Assignee: Slieve Mish Inventions Limited, Tralee, County Kerry (IE)

( * ) Notice: Subject to any disclaimer, the term of this patent is extended or adjusted under 35 U.S.C. 154(b) by 1794 days.

(21) Appl. No.: 11/638,452

(22) Filed: Dec. 14, 2006

(65) Prior Publication Data
US 2007/0142044 A1 Jun. 21, 2007

Related U.S. Application Data

(60) Provisional application No. 60/750,383, filed on Dec. 15, 2005.

(51) Int. Cl.
*H04Q 7/20* (2006.01)
(52) U.S. Cl.
USPC ........................................ 455/422.1; 455/445
(58) Field of Classification Search .......... 370/229–340;
455/433, 426.1, 458, 422.1
See application file for complete search history.

(56) References Cited

U.S. PATENT DOCUMENTS

| 5,761,195 | A | | 6/1998 | Lu et al. ........................ 370/329 |
|---|---|---|---|---|
| 5,905,952 | A | * | 5/1999 | Joensuu et al. ............... 455/433 |
| 5,953,651 | A | | 9/1999 | Lu et al. ........................ 455/408 |
| 2004/0248546 | A1 | * | 12/2004 | Bhaumick .................. 455/404.2 |
| 2005/0136832 | A1 | * | 6/2005 | Spreizer ...................... 455/3.02 |
| 2007/0004455 | A1 | * | 1/2007 | Wennberg et al. ............ 455/558 |
| 2008/0300005 | A1 | * | 12/2008 | Phool ........................... 455/525 |

FOREIGN PATENT DOCUMENTS

| EP | 0 797 319 | 9/1997 |
|---|---|---|
| WO | 92/12603 | 7/1992 |
| WO | WO2005/022779 | 3/2005 |

\* cited by examiner

*Primary Examiner* — Phuoc Doan
(74) *Attorney, Agent, or Firm* — Jacobson Holman PLLC

(57) ABSTRACT

A mobile network comprises remote base transceiver station (BTS) nodes (3, 4) linked with a central base station controller (BSC) node (9). The latter is in turn linked with a mobile switching center (MSC, 10), a visitor location register (VLR, 11), and a home location register (HLR, 8). Mobile stations (2, MS-A, MS-B, and MS-C) are located in the cells of the BTSs (3, 4). The remote nodes (3, 4, 3(*a*), 4(*a*)) are connected to the central node BSC (9) over a remote backhaul satellite connection. Calls are routed locally while the central nodes continue to manage calls and services from central feature-rich and typically more reliable switches of a core network. This means that calls set up between subscribers on the same remote node get connected within the remote node but call supervision is still carried out by the central nodes. The features and services of the existing core network are preserved. For example, if the calling subscriber is a pre-paid GSM subscriber and their account runs out during the call a release signal will still be sent from the central node to the remote even though the voice traffic is being handled by the remote node.

20 Claims, 2 Drawing Sheets

Call set-up Message Sequence

Note: Messages relating to authentication, TMSI management and CM_Service_request have been omitted for clarity.

Call set-up Message Sequence

Note: Messages relating to authentication, TMSI management and CM_Service_request have been omitted for clarity.

COMMUNICATIONS SYSTEM AND METHOD

This is a complete application claiming benefit of provisional 60/750,383 filed Dec. 15, 2005.

INTRODUCTION

1. Field of the Invention

The invention relates to mobile networks.

2. Prior Art Discussion

The communications requirements of the emerging market communities differ substantially from those of more developed economies. The percentage of traffic which remains local to a community is typically above 70%. Standard network switching functionality meets these requirements for large urban type communities. Out at remote communities, however, routing of these local calls can prove extremely costly. 'Soft switch' type functionality (such as a software-based MSC) is an option but the introduction of such switching elements into networks creates a lack of uniformity in switching functionality across a network, and this has an onerous impact on the network's ability to provide services uniformly across a network. For example, it may not be possible to uniformly upgrade an enhanced billing system across the full network as the "soft switches" may not support it.

This system aims to reduce backhaul bandwidth requirements for remote telecommunications nodes.

SUMMARY OF THE INVENTION

According to the invention, there is provided a method of operation of a mobile network comprising central nodes including a switching node and at least one remote cell having nodes linked with the central nodes via a remote backhaul communication link, the method comprising the steps of:
- a mobile device registered with a remote mobile network cell node making a voice or data call to a called device registered with the same or a different remote mobile network cell node,
- a network node recognising that the calling and called mobile devices are both registered with a remote cell according to signalling fed back from the remote nodes to the central nodes and an association between a network-specific identifier and a stable international subscriber identifier of the called device,
- a network node making a decision to connect the call locally without it being routed through the central switching node and so avoiding allocation of bandwidth for the call on the remote backhaul communication link, and
- a local node connecting the call locally.

In one embodiment, a remote node routes a signalling channel for the call to a central node, but does not route a call channel.

In one embodiment, the decision is made by a central node and said central node transmits a switching instruction to a remote node.

In one embodiment, the decision is made by a remote node, and the remote node transmits a data update to the central switching node to indicate status of the call which has been switched locally.

In one embodiment, a network node intercepts the stable international subscriber identifier from a signal from a remote node to a central node concerning the call, and intercepts the network-specific identifier from a subsequent paging signal from a central node to a remote node, and determines the association between said identifiers by looking up a cache.

In one embodiment, the cache is maintained and updated by a central node.

In one embodiment, said central node replicates said cache in remote node.

In one embodiment, the network-specific identifier is an IMSI, and the stable international subscriber identifier is an MSISDN.

In another embodiment, the remote nodes are in a plurality of remote network cells, and the call is connected locally between different remote mobile network cells.

In one embodiment, the call is connected locally within the same remote mobile network cell.

In one embodiment, the remote nodes are interconnected in a mesh.

In one embodiment, the mesh is a WiMax mesh.

In one embodiment, data from a HLR is used to update the cache.

In one embodiment, to update the cache, a call is made to a test mobile device or a message is sent to a test mobile device using the stable international subscriber identifier.

In one embodiment, the call is routed locally by a remote cell transceiver proxy node.

In one embodiment, the decision is made by a central base station controller proxy node.

In one embodiment, the call is routed locally by a remote part of a physically split base station controller, the other part of the base station controller being centrally located.

In one embodiment, the base station controller part located centrally makes the decision.

In another aspect, the invention provides a mobile network comprising remote cells with remote nodes linked via a remote backhaul communications link to central nodes including a switching node, wherein the network nodes are adapted to perform any method as defined above.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

The invention provides the ability to route calls locally while continuing to manage calls and services from central feature-rich and typically more reliable switches of a core network. This means that calls set up between subscribers on the same remote node get connected within the remote node but call supervision is still carried out by the central nodes. The features and services of the existing core network are preserved. For example, if the calling subscriber is a pre-paid GSM subscriber and their account runs out during the call a release signal will still be sent from the central node to the remote node even though the voice traffic is being handled by the remote node. The call which is switched locally may involve voice or data traffic.

The following embodiment is in the context of a GSM mobile network, however the invention can be applied to other mobile network types such as CDMA or 3G, the appropriate corresponding nodes being involved.

Figure 1:
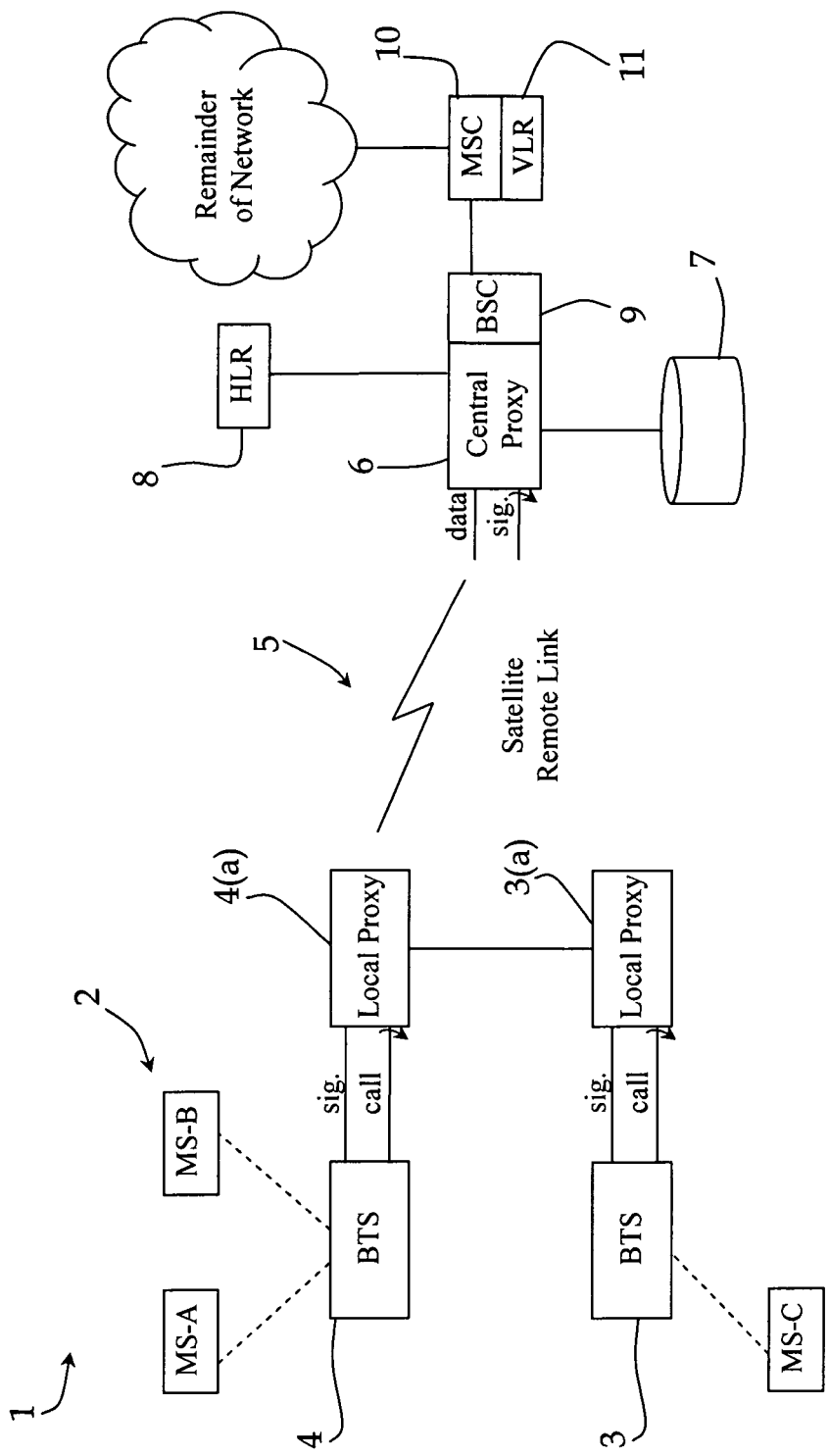
FIG. 1 is a block diagram of part of a mobile network of the invention.

Referring to FIG. 1 a mobile network 1 is used by mobile stations 2, and it comprises two remote base transceiver station (BTS) nodes 3 and 4 linked with a central base station controller (BSC) node 9 via a remote backhaul satellite link 5. The BSC 9 is in turn linked with a mobile switching centre (MSC) 10, a visitor location register (VLR) 11, and a home location register (HLR) 8. Mobile stations 2 MS-A, MS-B, and MS-C are located in the cells of the BTSs 3 and 4.

At the remote cells local proxies 3(a) and 4(a) are connected to the BTSs 3 and 4 respectively. Each proxy handles BTS-BSC signalling, but the voice/data channel is looped back as illustrated for local switching. At the central location there is a central proxy 6 for the BSC 9, linked with a database 7.

The system reduces backhaul bandwidth requirements for the remote link while maintaining signalling flows with the central nodes of the network. Calls set up between subscribers on the same remote nodes are connected within the remote node but call supervision is still carried out by the central nodes. The features and services of the existing core network are preserved. For example, if the calling subscriber is a pre-paid GSM subscriber and their account runs out during the call a release signal will still be sent from the central node to the remote node even though the voice traffic is being handled only by the remote node.

Mobile Subscribers (MS) register with the network when they roam into the coverage area of the remote node. Data relating to these subscribers' identity and capabilities are stored in the HLR 8 and in the VLR 11 associated with the MSC 10.

The MSC 10 enables calls to be set-up between mobile subscribers and other mobile subscribers or land lines via a PSTN (not shown). The MSC 10 also handles supplementary services, call supervision, and billing.

Figure 2:
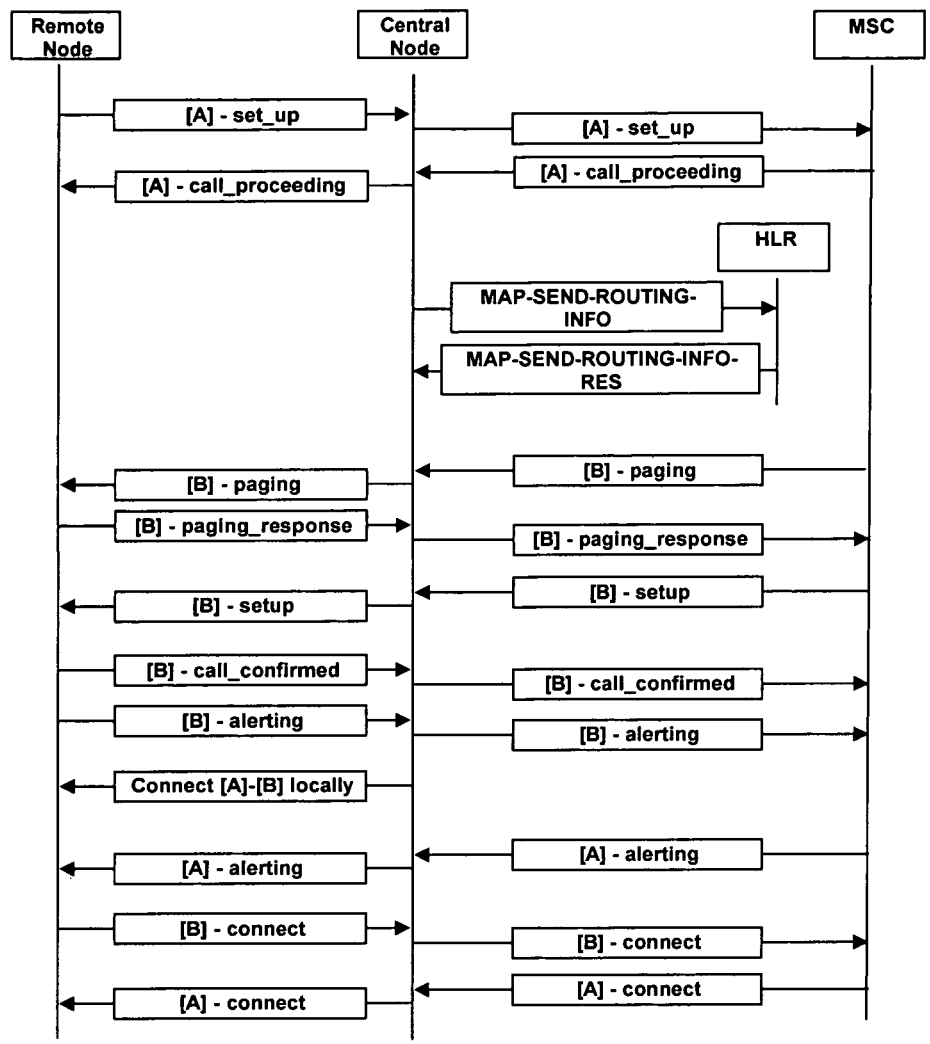
FIG. 2 is a diagram illustrating a call set-up message sequence.

Operation (Referring also to FIG. 2).

In a GSM cellular system the main parameters used to identify a subscriber are the MSISDN (Mobile Subscriber ISDN Number) and the IMSI (International Mobile Subscriber Identity). A subscriber may change network (for example GSM network) and maintain their existing MSISDN so that they are still contactable at the same international telephone number, however the IMSI will have to change since it contains the operator's network code. The relationship between a subscriber's IMSI and MSISDN is maintained in the HLR 8.

In a conventional GSM system, when subscriber A calls subscriber B then subscriber A dials the MSISDN of subscriber B. The messages containing the dialed MSISDN are passed through a BTS, a BSC, and an MSC which routes the call based on the dialed digits. Once the called party has been located a paging message is sent by the MSC through a BSC and a BTS to the called party. This paging message contains the IMSI of the called party. Network nodes see the MSISDN passing in one direction and the IMSI passing in the other direction.

In this invention when subscriber A calls subscriber B a "setup" message containing the MSISDN of subscriber B is sent through the BTS 4 and the BSC 9 to the MSC 10. The central proxy 6 extracts the MSISDN of subscriber B from the message and uses it to perform a HLR 8 lookup (MAP-SEND-ROUTING-INFORMATION). The response from the HLR 8 contains the MSISDN and the IMSI of the called subscriber B. This relationship is cached by the central proxy 6 in the database 7 for use later in the procedure.

The MSC 10 sends a paging message to the BSC 9 to alert subscriber B of the incoming call. This paging message contains the IMSI of subscriber B. The paging message is intercepted by the proxy 6, which then performs a database 7 lookup. If the IMSI received matches the IMSI retrieved from the HLR then this indicates that the call is between two subscribers on the same remote BTS. In this case the proxy 6 sends a signal to the remote proxy 3(a) instructing it to directly connect the two sides of the call once subscriber B has answered (connect [A]-[B] locally). The central proxy 6 accepts any connections to and from the MSC 10 but does not forward these connections to the remote BTSs and so no satellite bandwidth needs to be allocated for the voice connection.

The MSISDN to IMSI relationship which is cached in the database 7 may also or alternatively be replicated to the remote proxies 3(a) and 4(a) so that the decision to connect locally may be made by a remote proxy. The MSISDN to IMSI relationship described above may also be established when the user registers with the network by probing the interface between the MSC/VLR and the HLR or by emulating the behaviour of the MSC/VLR and retrieving the information directly from the HLR.

In an alternative embodiment the central proxy 6 inserts a special identifier (e.g. user-to-user signalling field) into the setup message from subscriber A to the MSC 10 or by inserting a special identifier (e.g. DTMF tone or digital sequence) into the speech stream. The MSC 10 will include this identifier in the setup message or speech stream sent to subscriber B. The central proxy 6 extracts the identifier from the B setup message or speech stream and checks to see if it matches the identifier sent in the A setup message or speech stream. If the identifiers match then the central proxy 6 sends a signal to the remote proxy 3(a) or 4(a) instructing it to connect the two sides of the call at the remote proxy once B has answered (connect [A]-[B] locally). The central proxy 6 accepts any connections to and from the MSC 10 but does not forward these connections to the remote nodes and so no satellite bandwidth needs to be allocated for the voice connection. Because the MSC 10 "thinks" it is switching the call, it operates in a conventional manner.

In all cases described above the central and remote nodes may cache MSISDN to IMSI relationships for future calls.

Fully Meshed System.

In alternative embodiments remote nodes are interconnected utilising cost-effective connectivity means such as WiMax. These remote nodes continue to mesh together as the remote elements increase in density, the continuing evolution of which constitutes a meshed network. In this case it is possible to connect calls between remote nodes to maximise transmission efficiency without traversing the central node or the MSC. The procedure for setting up these calls is as described above except that the central node instructs each remote node to establish a connection to the other remote node and to use this connection to carry the voice traffic. This evolving mesh network can minimise backhaul requirements, maximise functionality available to the remote users, and also introduce link redundancy. The decision process on remote node interconnection and the management of such can be managed centrally from the service provider's network operations centre.

Embodiment with Distributed BSC

In another embodiment, the central node is one part or gateway of a BSC and one of the remote nodes is another physically separate part of this BSC, the BSC being split as described in our published PCT specification no. WO2005/022779.

Cache Maintenance

As described above, there is a cache in the central proxy database 7 which maintains the IMSI to MSISDN relationship, this cache being used when calls are being set-up to determine if the two subscribers are on the same remote node. If the two subscribers are on the same remote node then the call is switched at the remote node and does not need any backhaul (satellite link) for the speech (or data traffic) path. The embodiments above describe two methods for updating the contents of this cache: (a) a MAP query to the HLR at call set-up, and (b) injection of an indicator in the signalling stream (user-to-user signalling) or voice stream (special DTMF or binary sequence).

The cache can be initialised by downloading the complete list of IMSI-MSISDN relationships from the HLR using a proprietary interface specific to the HLR manufacturer. The cache would then be updated periodically as new subscribers are added to or removed from the HLR or changes are made to the HLR entries using a proprietary interface.

Alternatively, after the Location Update (registration) procedure has been completed for each subscriber a test call would be generated from one of the proxies to a test mobile or a test number associated with the central node. The proxy uses the calling line identity (MSISDN) received as part of this transaction and the calling IMSI to establish the relationship and update the cache.

Alternatively, after the Location Update (registration) procedure has been completed for each subscriber a test SMS is generated from one of the proxies to a test mobile device or to a test interface on the subscriber's SMSC (e.g. SMPP interface) associated with the central node. The proxy uses the sender's identity (MSISDN) received as part of this transaction and the sender's IMSI to establish the relationship and update the cache.

Alternatively, subscribers use a manual registration process to enter their MSISDN into the system. During this procedure the subscriber uses an SMS message, a USSD transaction or a voice call to an IVR to indicate their MSISDN to the system. The proxy captures the IMSI from the signalling and the MSISDN from the subscriber's input and updates the cache with this association. Optionally, a password can be associated with this transaction for security or to limit this operation to a selected group of subscribers.

The invention is not limited to the embodiments described but may be varied in construction and detail. Where different mobile network technologies are used the equivalent network nodes and code/number codes apply. For example, in some existing CDMA networks the equivalent of an IMSI is a Mobile Identity Number MIN.

The invention claimed is:

1. A method of operation of a mobile network comprising a central node, an MSC and a HLR and at least one remote cell having remote nodes linked with the central node via a remote backhaul communication link, the method comprising steps of:
   a mobile device registered with a remote cell making a voice or data call to a called device registered with the same or a different remote cell,
   a central node intercepting a call setup message for said call,
   the central node interrogating the HLR using the MSISDN contained in the intercepted call setup message to obtain the IMSI of the called subscriber,
   the central network node caching said IMSI and maintaining and updating said cache, and replicating said cache in the remote node,
   the central node or the remote node intercepting a paging message sent to alert the called subscriber,
   the central node or the remote node looking up the cache, and
   if an IMSI retrieved from the cache matches the IMSI received in the paging message:
      the central node or the remote node making a decision to connect the call locally without it being routed through the MSC,
      if the decision is made by the central node, the central node sending a signal to the remote node instructing it to directly connect the call, and
      the remote node connecting the call locally.

2. The method as claimed in claim 1, wherein a remote node routes a signalling channel for the call to a central node, but does not route a call channel.

3. The method as claimed in claim 1, wherein a remote node routes a signaling channel for the call to a central node, but does not route a call channel; and wherein the decision is made by a central node and said central node transmits a switching instruction to a remote node.

4. The method as claimed in claim 1, wherein the decision is made by a remote node, and the remote node transmits a data update to the central switching node to indicate status of the call which has been switched locally.

5. The method as claimed in claim 1, wherein said central node replicates said cache in a remote node.

6. The method as claimed in claim 1, wherein the remote nodes are in a plurality of remote network cells, and the call is connected locally between different remote mobile network cells.

7. The method as claimed in claim 1, wherein the call is connected locally within the same remote mobile network cell.

8. The method as claimed in claim 1, wherein the remote nodes are interconnected in a mesh.

9. The method as claimed in claim 1, wherein the remote nodes are interconnected in a mesh; and wherein the mesh is a WiMax mesh.

10. The method as claimed in claim 1, wherein, to update the cache, a call is made to a test mobile device or a message is sent to a test mobile device using the stable international subscriber identifier.

11. The method as claimed in claim 1, wherein the call is routed locally by a remote cell transceiver proxy node.

12. The method as claimed in claim 1, wherein the decision is made by a central base station controller proxy node.

13. The method as claimed in claim 1, wherein the call is routed locally by a remote part of a physically split base station controller, the other part of the base station controller being centrally located.

14. The method as claimed in claim 1, wherein the call is routed locally by a remote part of a physically split base station controller, the other part of the base station controller being centrally located; and wherein the base station controller part located centrally makes the decision.

15. A mobile network comprising remote cells with remote nodes linked via a remote backhaul communications link to central nodes including a switching node, wherein the network nodes are adapted to perform a method as claimed in claim 1.

16. A method of operation of a mobile network comprising a central node, an MSC and a HLR and at least one remote cell having remote nodes linked with the central node via a remote backhaul communication link, the method comprising the steps of:

(i) a mobile device registered with a remote cell making a voice or data call to a called device registered with the same or a different remote cell, (ii) a remote node or the central node inserting a special identifier into a setup message or a speech stream for said call, (iii) the MSC including said special identifier in a setup message or speech stream sent to the called mobile device; and (iv) said remote node or central node extracting the special identifier from said setup message or speech stream sent by the MSC and checking if it matches the identifier inserted in step (ii), if the identifiers match:
- the central node or the remote node making a decision to connect the call locally without it being routed through the MSC,
- if the decision is made by the central node, the central node sending a signal to the remote node instructing it to directly connect the call, and
- the remote node connecting the call locally.

17. The method as claimed in claim 16, wherein the node which makes said decision is a central node.

18. The method as claimed in claim 16, wherein the central node is a central proxy.

19. The method as claimed in claim 16, wherein the node which makes said decision is a remote node.

20. The method as claimed in claim 16, wherein, in step (b), the special identifier is inserted into a speech stream.

* * * * *